(12) United States Patent
Kung (10) Patent No.: US 10,605,255 B2
(45) Date of Patent: Mar. 31, 2020

(54) SHAFT-SEALING DEVICE (71) Applicant: Chi-Yun Kung, Kaohsiung (TW)

(72) Inventor: Chi-Yun Kung, Kaohsiung (TW)

(*) Notice: Subject to any disclaimer, the term of this patent is extended or adjusted under 35 U.S.C. 154(b) by 87 days.

(21) Appl. No.: 16/018,179

(22) Filed: Jun. 26, 2018

(65) Prior Publication Data
US 2019/0145421 A1 May 16, 2019

(30) Foreign Application Priority Data

Nov. 13, 2017 (TW) .............................. 106139199 A (51) Int. Cl.
*F04D 29/12* (2006.01)
*F16J 15/34* (2006.01)
*F04D 29/42* (2006.01)
*F04D 29/10* (2006.01)

(52) U.S. Cl.
CPC ......... *F04D 29/128* (2013.01); *F04D 29/106* (2013.01); *F04D 29/426* (2013.01); *F16J 15/3404* (2013.01); *F16J 15/3484* (2013.01)

(58) Field of Classification Search
CPC ..... F04D 29/106; F04D 29/128; F16J 15/324; F16J 15/3404
See application file for complete search history.

(56) References Cited

U.S. PATENT DOCUMENTS

| | | | | |
|---|---|---|---|---|
| 5,238,253 A | * | 8/1993 | Sieghartner | ........... F01D 11/003 277/361 |
| 8,042,813 B2 | | 10/2011 | Kung | |
| 9,347,565 B2 | * | 5/2016 | Berger | ................. F16J 15/3496 |
| 9,651,156 B2 | * | 5/2017 | Aoike | ................. F16J 15/3404 |

* cited by examiner

*Primary Examiner* — Ninh H. Nguyen
(74) *Attorney, Agent, or Firm* — Alan D. Kamrath; Mayer & Williams PC (57) ABSTRACT

A shaft-sealing device for a pump includes a seal housing attached to a pump housing in which a rotary shaft is mounted. The seal housing is provided with a coolant inlet passage and a coolant outlet passage, both of which interconnect with a seal space in the seal housing. The coolant outlet passage intersects with the seal space at an opening at which first and second sides are defined according to a flowing direction of a coolant. The seal space includes an inner annular surface having a first section adjacent to the first side of the opening. A guide slot is provided in the first section of the inner annular surface. With a pump ring in the seal housing rotating, the coolant is guided into the seal space via the coolant inlet passage and further discharged from coolant outlet passage through the opening smoothly due to the guide slot.

20 Claims, 10 Drawing Sheets

SHAFT-SEALING DEVICE

BACKGROUND OF THE INVENTION

1. Field of the Invention

The present invention relates to a shaft-sealing device for a pump and, more particularly, to a mechanical shaft seal structure for a centrifugal pump.

2. Description of the Related Art

It is usual to mount a mechanical seal in a pump for sealing between a pump housing of the pump and a rotary shaft. A typical mechanical seal generally includes a stationary ring secured in the pump housing and a rotary ring moveably mounted around the rotary shaft or a shaft sleeve and biased by springs toward the stationary ring to provide sealing engagement therebetween, thereby preventing a transported pump fluid in the pump housing from leaking from a relatively moveable interface between the stationary and rotary rings to the environment. In such a mechanical seal, the stationary and rotary rings will wear and generate considerable heat during relatively rotational operation at the sealing interface due to direct metal-to-metal contact therebetween. To reduce the wear and heat at the sealing interface, an additional cooling and/or lubricating device is often required.

U.S. Pat. No. 8,042,813 discloses a shaft-sealing device including a seal cover adapted to be attached to a pump housing in which a rotary shaft is mounted. The seal cover includes a shaft hole extending along an axis of the rotary shaft and including an enlarged shaft-sealing section. The seal cover further includes a coolant inlet through which a coolant is supplied into the shaft-sealing section and a coolant outlet extending from an outer periphery of the seal cover into the shaft-sealing section and intersecting the shaft-sealing section at an opening. The opening is delimited by a circumference having a first side and a second side downstream from the first side along a flowing direction of the coolant in the shaft-sealing section. A shaft sleeve extends through the shaft hole of the seal cover and is adapted to be mounted around the rotary shaft to rotate therewith. A stationary ring is mounted around the shaft sleeve, and a rotary ring is moveably mounted around the shaft sleeve and biased toward the stationary ring to provide sealing engagement therebetween. A fender projects from the second side of the circumference delimiting the opening into the shaft-sealing section and is spaced from the shaft sleeve. The fender is a substantially quadrangular plate and has a side face facing the opening and guiding the coolant into the coolant outlet through the opening when the coolant fed into the shaft-sealing section flows through the opening of the coolant outlet and encounters the side face of the fender.

However, turbulence attributed to the coolant striking the fender (the quadrangular plate) is produced at the coolant outlet at which the discharge of flowing coolants is choked due to the turbulence, abates the circulation efficiency of coolants and cools down the stationary ring and the rotary ring, both of which rub against each other, unsatisfactorily.

Against this background, a progressive shaft-sealing structure for a pump should be provided for no drawback of conventional shaft seals for a pump and promotion of public safety.

BRIEF SUMMARY OF THE INVENTION

It is an objective of the present invention to provide a shaft-sealing device for promoting the circulating efficiency of coolants, ensuring a safety operation and featuring a simplified structure.

To achieve this and other objectives, a shaft-sealing device according to an embodiment of the present invention includes a seal housing, a first rotary sealing device, and a pump ring. The seal housing is adapted to be mounted to the pump housing in which a rotary shaft is mounted. The seal housing includes a center hole extending along an axis of the rotary shaft and having an enlarged seal space expanding in a radial direction of the center hole. The seal housing further includes a coolant inlet passage through which a coolant is supplied into the seal space and a coolant outlet passage extending from an outer periphery of the seal housing into the seal space and intersecting the seal space at an opening. The opening includes a circumference having a first side and a second side downstream from the first side along a flowing direction of the coolant in the seal space. An inner annular surface is defined by a wall of the center hole around the seal space and includes a first section adjacent to the first side and a second section adjacent to the second side. A guide slot is provided in the first section of the inner annular surface and in communication with the coolant outlet passage. The first rotary sealing device includes a first stationary ring and a first rotary ring mounted around the rotary shaft. The first stationary ring abuts against the first rotary ring for development of a first sealing interface therebetween. The pump ring is securely mounted around the rotary shaft to rotate therewith and includes an outer circumference having a plurality of protrusions annularly spaced from one another and extending along the axis.

In an embodiment, the guide slot includes a slot bottom having a first end adjacent to the opening and a second end away from the opening. The first end is developed at the coolant outlet passage, and the slot bottom is gradually deepened from the second end to the first end. The guide slot is formed within a range of a first circumferential angle of the inner annular surface between the first and second ends. The first circumferential angle is between 30 and 120 degrees preferably.

In an embodiment, the opening, is developed in the inner annular surface. A converging section is formed at the first section of the inner annular surface and includes a front end adjacent to the opening and a rear end away from the opening. The converging section is gradually reduced in a radius of the inner annular surface from the rear end to the front end. The guide slot is developed in the converging section.

In an embodiment, the pump ring further includes spaced first and second ends and an annular hole extending from the first end through the second end. The first end is provided with a flange extending inwardly around a periphery of the annular hole. The annular hole includes an annular wall provided with a plurality of raised ribs. The first rotary ring is received in the annular hole and includes an outer annular surface provided with a plurality of cutaway portions engaged with the raised ribs. A plurality of springs is installed between the first rotary ring and the flange.

In an embodiment, a stream guide member is provided at the second side of the opening. A gap is formed between the stream guide member and the plurality of protrusions on the pump ring in a radial direction perpendicular to the axis of the rotary shaft. The front end of the converging section faces the stream guide member. The stream guide member includes a lateral end surface facing the first side and having an open slot which matches an edge of the opening in shape.

In an embodiment, the shaft-sealing device further includes a second rotary sealing device including a second stationary ring, a second rotary ring, and a spring holder. A second sealing interface is defined between the second stationary ring and the second rotary ring. The second rotary ring and the spring holder are mounted around the rotary shaft, and the spring holder includes a first end surface adjacent to the second rotary ring. The first end of the spring holder is provided with an annular groove therein. The second rotary ring and a plurality of springs abutting against the second rotary ring are received in the annular groove. The seal housing includes an internal side provided with a mounting portion, and the second stationary ring is fixed on the mounting portion.

In an embodiment, the shaft-sealing device further includes a shaft sleeve extending through the center hole of the seal housing and mounted around the rotary shaft to rotate therewith. The pump ring, the first rotary ring, the second rotary ring and the spring holder are installed around an outer surface of the shaft sleeve.

The present invention will become clearer in light of the following detailed description of illustrative embodiments of this invention described in connection with the drawings.

DETAILED DESCRIPTION OF THE INVENTION

Figure 1:
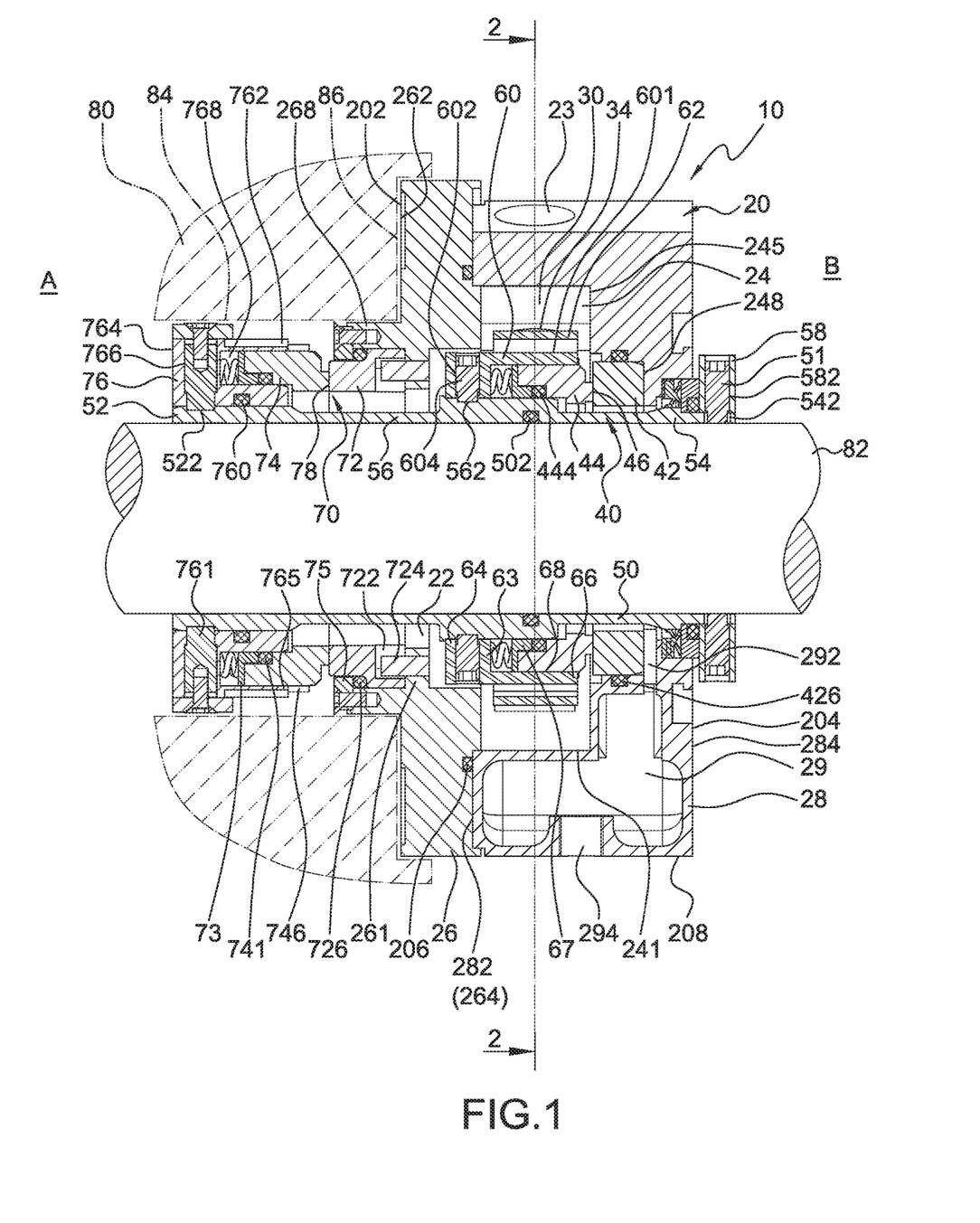
FIG. 1 is a sectional view of a shaft-sealing device according to an embodiment of the present invention, with the shaft-sealing device mounted in a pump housing and around an outer surface of a rotary shaft.
Figure 2:
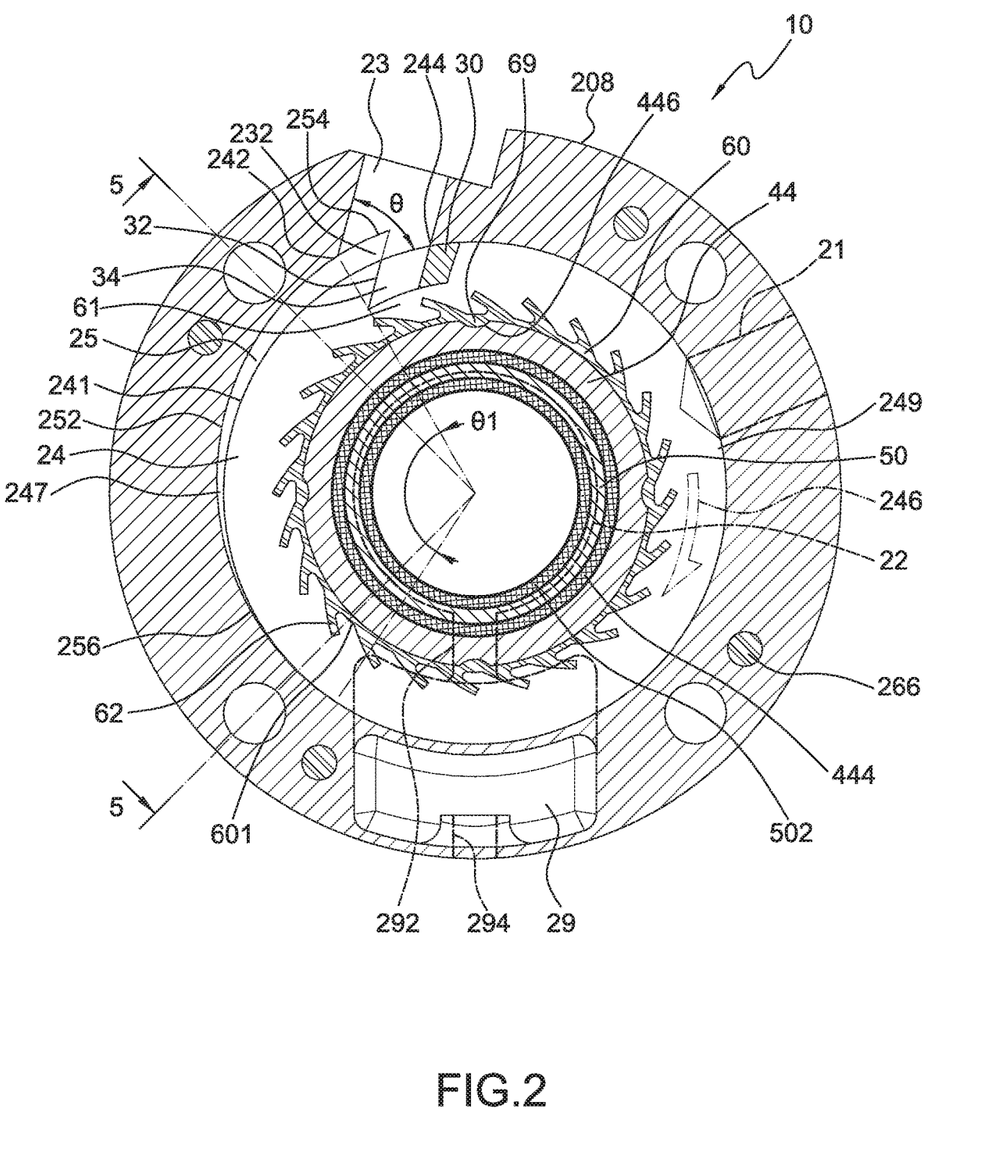
FIG. 2 is a cross sectional view according to section line 2-2 of FIG. 1.
Figure 3:
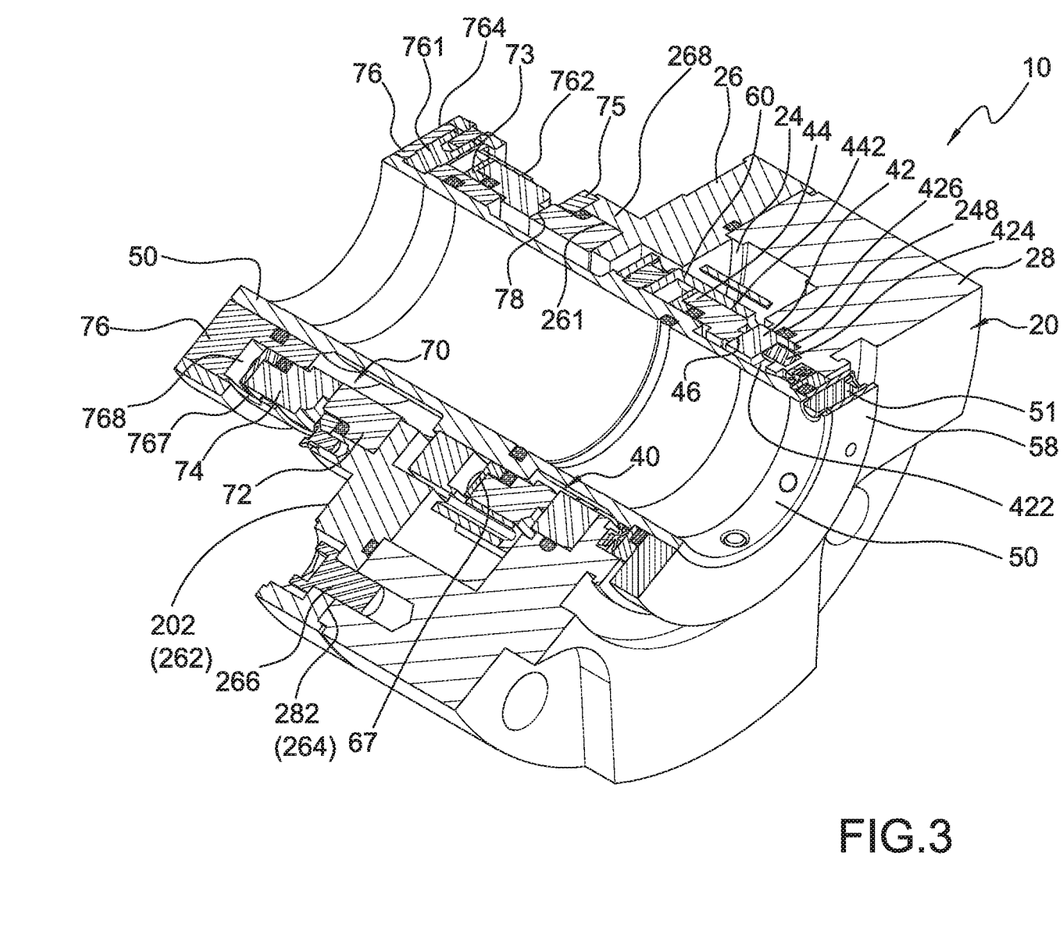
FIG. 3 is a perspective, cross-sectional view of the shaft-sealing device of FIG. 1 split from 150 degrees.

A shaft-sealing device 10 according to a preferred embodiment of the present invention is shown in FIGS. 1 through 3 of the drawings and can act as a sealing device mounted between a pump housing 80 and a rotary shaft 82 in a machine such as pump or compressor in an embodiment.

The rotary shaft 82, which penetrates a shaft hole 84 formed in the pump housing 80 and extends from the pump housing 80 through the shaft-sealing device 10 to the environment, is provided with vane wheels not shown in figures. The shaft-sealing device 10 is mounted around an outer surface 86 of the pump housing 80. An interior space A is defined at one side (the left-hand side in FIG. 1) of the shaft hole 84 of the pump housing 80, and an air space B as an exterior space is defined at the opposite side (the right-hand side in FIG. 1) of the interior space A axially (see FIG. 1). The shaft-sealing device 10 works as a device to prevent a transported pump fluid in the pump housing 80 from leaking from any gap between the pump housing 80 and the rotary shaft 82 to the environment.

According to the preferred form shown, the shaft-sealing device 10 includes a seal housing 20 attached to the pump housing 80, a first rotary sealing device 40, and a pump ring 60. The seal housing 20 includes a center hole 22 extending through a body thereof along an axis of the rotary shaft 82 and having a stepped configuration with smaller and larger diameter portions. The larger diameter portion of the center hole 22 defines a seal space 24 expanding in a radial direction of the center hole, and an inner annular surface 241 is defined by the wall of the center hole 22 around the seal space 24. The seal space 24 is in communication with an interior of the pump housing 80 and accommodates the first rotary sealing device 40 and the pump ring 60. The pump fluid in the pump housing 80 is enclosed with the first rotary sealing device 40 and isolated from the air space B outside.

The seal housing 20 includes an internal side face 202 facing the interior space A and an external side face 204 facing the air space B (FIG. 1). In this embodiment, the seal housing 20 includes a main body 26 at one side of the interior space A and an end cap 28 at one side of the air space B for convenient fabrication and assembly as required. The main body 26 includes an internal end surface 262 and an external end surface 264, and the end cap 28 includes an inner end surface 282 and an outer end surface 284. The internal end surface 262 of the main body 26 and the outer end surface 284 of the end cap 28 constitute the internal side face 202 and the external side face 204, respectively. The internal end surface 262 of the main body 26 is attached to the outer surface 86 of the pump housing 80, and the inner end surface 282 of the end cap 28 is attached to the external end surface 264 of the main body 26 and fixed with screws 266 (FIG. 3). Furthermore, an O-ring seal 206 is mounted between the inner end surface 282 of the end cap 28 and the external end surface 264 of the main body 26, so that the main body 26 is coaxially integrated with the end cap 28 and both an outer space of the seal housing 20 and an inner space (that is, the seal space 24) of the seal housing 20 are sealed in between.

The seal housing 20 includes an outer periphery 208 opposite to the inner annular surface 241 in a radial direction perpendicular to the axis. The seal housing 20 includes a coolant inlet passage 21 and a coolant outlet passage 23, each of which extends from the outer periphery 208 of the seal housing 20 into the seal space 24, as shown in FIG. 2. An external coolant is introduced into the seal space 24 through the coolant inlet passage 21 and discharged from the coolant outlet passage 23 for circulation cooling of the first rotary sealing device 40 inside the seal space 24. The coolant outlet passage 23 to which flowing coolant is guided is slantwise (not perpendicular) with respect to the inner annular surface 241 of the seal space 24, as shown in FIG. 2. In a preferred embodiment, the coolant outlet passage 23 relative to the inner annular surface 241 is slantwise by a slant angle θ from 0 to 60 degrees. The coolant outlet passage 23 intersects the seal space 24 at an opening 232 including a circumference having a first side 242 and a second side 244 downstream from the first side 242 along a flowing direction of the coolant (as indicated by arrow 246 in FIG. 2) in the seal space 24. The coolant introduced into the seal space 24 through the coolant inlet passage 21 is guided to the second side 244 from the first side 242. According to the preferred form shown, the coolant inlet passage 21 and the coolant outlet passage 23 are developed in the end cap 28.

Figure 4:
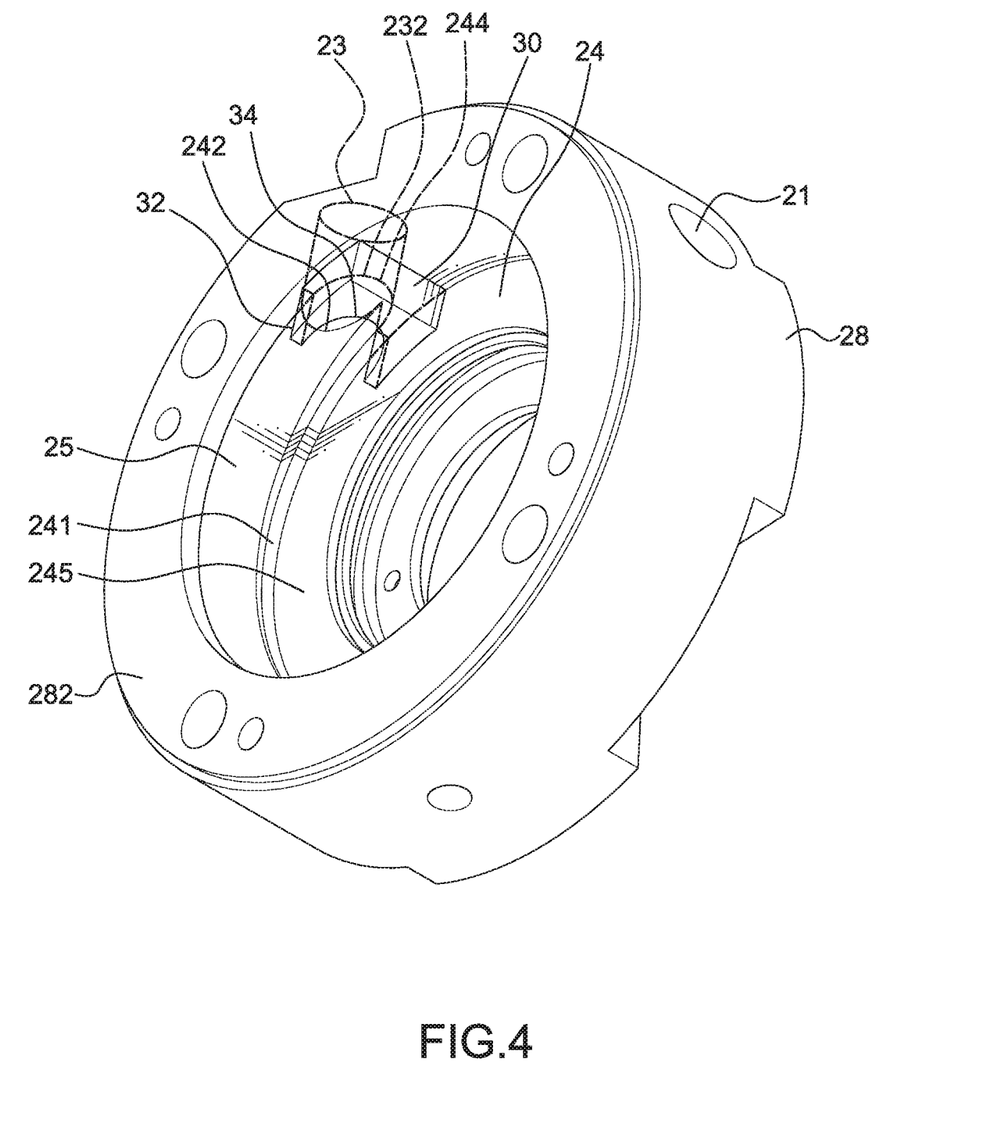
FIG. 4 is an upward perspective view of an end cap of the shaft-sealing device of FIG. 1.
Figure 5:
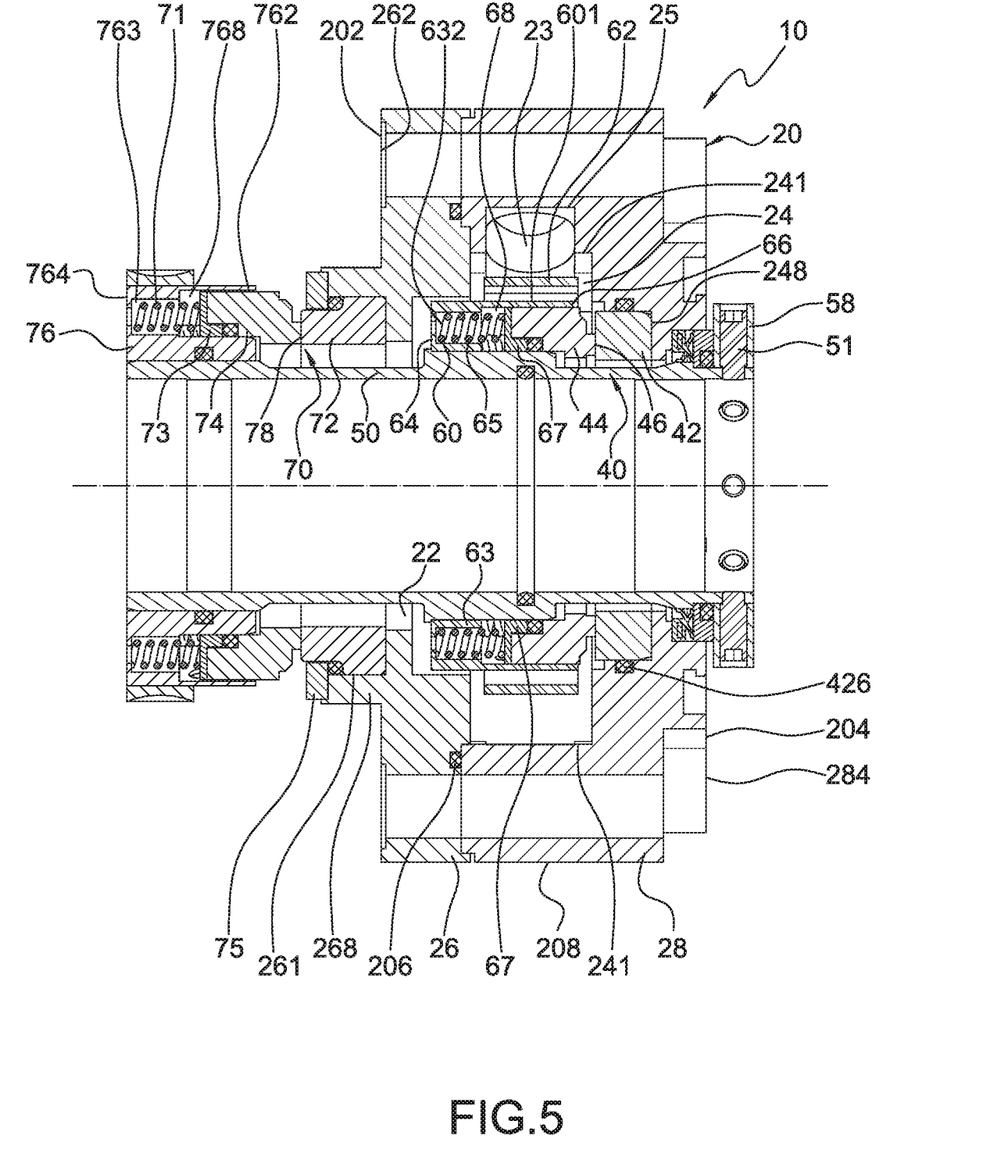
FIG. 5 is a cross sectional view according to section line 5-5 of FIG. 2.

The inner annular surface 241 includes a first section 247 adjacent to the first side 242 of the opening 232 and a second section 249 adjacent to the second side 244 of the opening 232. The coolant inlet passage 21 intersects the second section 249 of the inner annular surface 241. A guide slot 25 is provided in the first section 247 of the inner annular surface 241 of the seal space 24, as shown in FIGS. 2 and 4. The guide slot 25 includes a slot bottom 252 recessed from the inner annular surface 241 and having a first end 254 adjacent to the opening 232 and a second end 256 away from the opening 232. In this embodiment, the first end 254 is developed at the coolant outlet passage 23, so that the guide slot 25 interconnects the coolant outlet passage 23. The slot bottom 252 is gradually deepened from the second end 256 to the first end 254, and the guide slot 25 is formed within the range of a first circumferential angle θ1 of the inner annular surface 241 between the first and second ends 254 and 256. The first circumferential angle θ1 is between 30 and 120 degrees preferably.

The seal housing 20 further includes a stream guide member 30. In this embodiment, the stream guide member 30 is composed of a fender obliquely welded on the second side 244 of the opening 232, as shown in FIG. 4. The stream guide member 30 projects from the second side 244 of the circumference delimiting the opening 232 into the seal space 24 and includes a lateral end surface 32 facing the first side 242 and having an open slot 34 which has a substantially semicircular cross-section to match the edge of the opening 232 in shape (FIG. 4). In this embodiment, the lateral end surface 32 relative to the circumference delimiting the opening 232 is inclined at an acute angle matching the slant angle θ of the coolant outlet passage 23 (FIG. 2). The open slot 34 and the coolant outlet passage 23, both of which are concentric, have the same diameter.

The first rotary sealing device 40 includes a first stationary ring 42 and a first rotary ring 44. The first stationary ring 42 and the first rotary ring 44 constitute an elastic-contact first sealing interface 46 axially in between. The first stationary ring 42 is fixed on a stationary component. In this embodiment, the first stationary ring 42 has a notch 422 opened in an end surface thereof (FIG. 3), and a mounting portion 248 with a stair-step shape in structure is designed on a lateral wall surface 245 of the seal space 24 of the seal housing 20, such that the first stationary ring 42 is fixed on the mounting portion 248 with a pin 424 (FIG. 1 and FIG. 3), The first stationary ring 42 and the seal housing 20 abut against each other through an O-ring seal 426 for sealing any gap in between. The first rotary ring 44 and the rotary shaft 82 rotate together, and the first rotary ring 44 has an outer annular surface 442.

The pump ring 60 is mounted in the seal space 24 and securely mounted around the shaft sleeve 82 to rotate therewith. The pump ring 60 includes a plurality of protrusions 62 annularly spaced from one another at an outer circumference 601 thereof and extending along the axis. A gap 61 is formed between the protrusions 62 of the pump ring 60 and the stream guide member 30 in the radial direction perpendicular to the axis. The height of each protrusion and the number of the protrusions 62 are adjustable as required. When the rotary shaft 82 is running and enabling the pump ring 60 to rotate, the protrusions 62 rotating in the seal space 24 generate a centrifugal effect through which the coolant guided into the seal space 24 follow the rotating direction of the pump ring 60 to circulate. The coolant introduced into the opening 232 of the coolant outlet passage 23 from the coolant inlet passage 21 will strike the lateral end surface 32 of the stream guide member 30 and is guided by the stream guide member 30 and discharged from the seal space 24 via the coolant outlet passage 23 for circulations. The open slot 34 is effective in discharging coolants smoothly and relieving the back pressure caused by turbulence at the opening 232. The guide slot 25 increasing the coolant yield at the coolant outlet passage 23 makes coolants flow smoothly. Because the guide slot 25 interconnects with the coolant outlet passage 23 in design, coolants flowing inside the guide slot 25 will strike the wall of the coolant outlet passage 23 and are discharged out of the coolant outlet passage 23 smoothly even if the stream guide member 30 is not provided.

The shaft-sealing device 10 further includes a shaft sleeve 50 extending through the center hole 22 of the seal housing 20 and mounted around rotary shaft 82 to rotate therewith. The shaft sleeve 50 includes a first end 52 (an inner end closed to the interior space A), a second end 54 (an outer end closed to the air space B), and a central portion 56 between the first and second ends 52 and 54. The second end 54 is provided with a plurality of positioning holes 542 for engaging with a positioning ring 58 with a plurality of positioning screw holes 582. The positioning ring 58 is engaged with the rotary shaft 82 by screws 51 extending through the positioning screw holes 582 and the positioning holes 542 to the rotary shaft 82, jointing the shaft sleeve 50 and the rotary shaft 82 together. Both the first rotary ring 44 and the pump ring 60 are installed on an outer surface of the shaft sleeve 50 to rotate therewith. O-ring seals 502 and 444 are respectively mounted between the shaft sleeve 50 and the rotary shaft 82 as well as between the shaft sleeve 50 and the first rotary ring 44 for sealing any gap in between.

Figure 6:
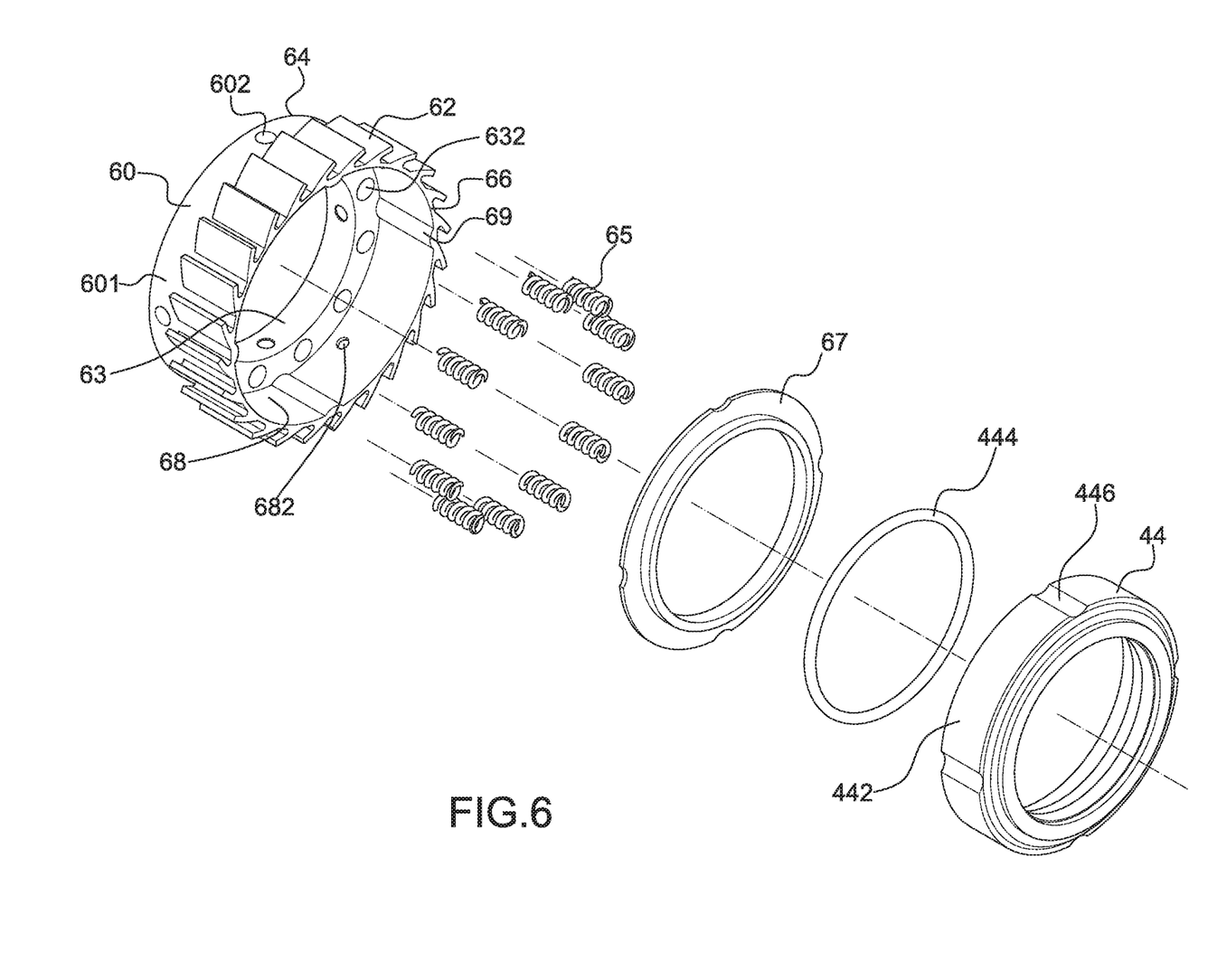
FIG. 6 is an exploded, perspective view which illustrates elements between a pumping ring and a first rotary ring of the shaft-sealing device of FIG. 1.

In this embodiment, the pump ring 60 further includes spaced first and second ends 64 and 66, and an annular hole 68 extending from the first end 64 through the second end 66. The protrusions 62 are created on the outer circumference 601 at the second end 66, as shown in FIG. 6. The first end 64 is provided with a flange 63 extending inwardly around a periphery of the annular hole 68, and a plurality of tapped location holes 602 are opened in the flange 63. With positioning bolts 604 penetrating the tapped location holes 602 and extending into a groove 562 in the central portion 56 of the shaft sleeve 50, the pump ring 60 and the shaft sleeve 50 join together. A plurality of springs 65 is installed between the first rotary ring 44 in the annular hole 68 and the flange 63, so that the first rotary ring 44 on which pressures from the springs 65 are applied is able to abut the first stationary ring 42 for development of the first sealing interface 46 in between. In this embodiment, the springs 65 are accommodated in a plurality of spring slots 632 which are arranged annularly and opened in an end surface of the flange 63. A gasket 67 is provided between the springs 65 and the first rotary ring 44 such that pressures are uniformly applied on the first rotary ring 44 by the springs 65. Raised ribs 69 designed on an annular wall of the annular hole 68 can be engaged with cutaway portions 446 in an outer annular surface 442 of the first rotary ring 44, so that the first rotary ring 44 can be driven by the pump ring 60 to rotate together and the first rotary ring 44 is moveable axially. At least one perforation 682 is opened in the pump ring 60 and communicates the annular hole 68 with the outer circumference 601, so that any debris attributed to frictions among the pump ring 60, the springs 65, the gasket 67 and the first rotary ring 44 and produced in the annular hole 68 can be discharged from the perforation 682.

Figure 7:
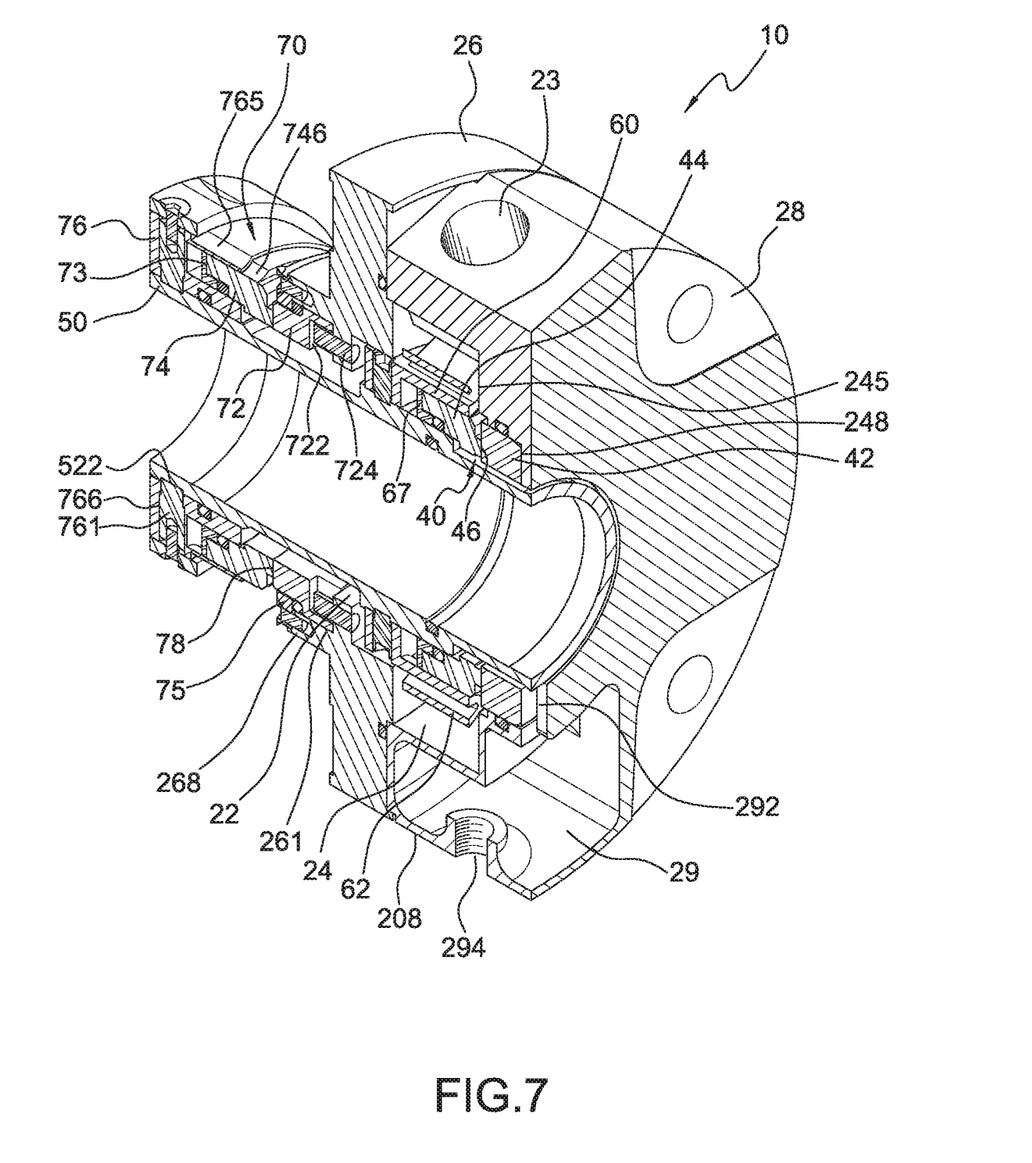
FIG. 7 is a perspective, cross-sectional view of the shaft-sealing device of FIG. 1 split at a channel.

The seal housing 20 further includes a chamber 29 provided in a lower end of the center hole 22 (see FIG. 1 and FIG. 7). A channel 292 formed between the seal space 24 and the external side face 204 of the seal housing 20 communicates the chamber 29 with the center hole 22. A discharge outlet 294 is developed between the chamber 29 and the exterior (the outer periphery 208) of the seal housing 20. If slight leakage is detected at the first sealing interface 46 of the first rotary sealing device 40, a small amount of leaking coolants (or including transported fluid) from the pump housing 80 and the seal space 24 are collected in the chamber 29 through the channel 292, such that a pump needs not to be shut down immediately for troubleshooting of slight leakage. Moreover, the discharge outlet 294 can be sealed with a screw (not shown in FIG. 7).

Figure 8:
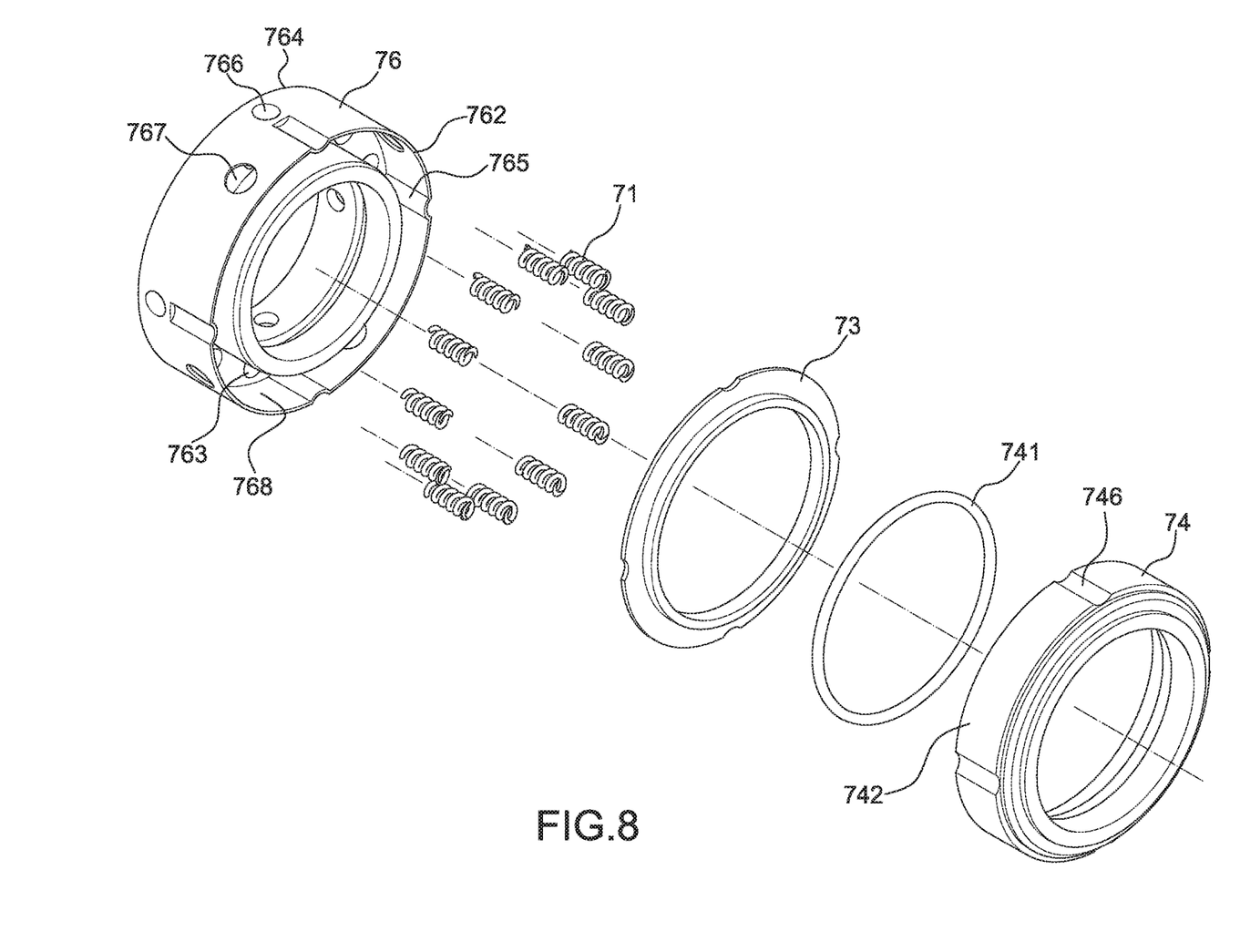
FIG. 8 is an exploded, perspective view which illustrates elements between a spring holder and a second rotary ring of the shaft-sealing device of FIG. 1.

The shaft-sealing device 10 further includes a second rotary sealing device 70 which includes a second stationary ring 72, a second rotary ring 74, and a spring holder 76, as shown in FIGS. 7 and 8. The second stationary ring 72 and the second rotary ring 74 constitute an elastic-contact second sealing interface 78 in the axial direction of the rotary shaft 82. The second stationary ring 72 is fixed on a stationary component. In this embodiment, the second stationary ring 72 has a notch 722 opened in an end surface thereof, and a mounting portion 261 formed by an annular shoulder 268 is designed on the internal side face 202 of the seal housing 20, so that the second stationary ring 72 is fixed on the mounting portion 261 with a pin 724 (FIG. 1). An O-ring seal 726 is provided between the second stationary ring 72 and the seal housing 20 for sealing any gap in between.

The spring holder 76 is used to couple with the second rotary ring 74 which is mounted between the spring holder 76 and the second stationary ring 72. An O-ring seal 760 is provided between the spring holder 76 and the shaft sleeve 50 for sealing any gap in between (FIG. 1). The spring holder 76 includes spaced first and second end surfaces 762 and 764, and the first end surface 762 is closed to the second rotary ring 74. The spring holder 76 is provided with a plurality of tapped location holes 766 therein, and an annular groove 768 in which the second rotary ring 74 is accommodated is formed in the first end surface 762. An O-ring seal 741 is provided between the annular groove 768 and the second rotary ring 74 for sealing any gap in between. With bolts 761 penetrating the tapped location holes 766 and extending into a groove 522 in the first end 52 of the shaft sleeve 50, the spring holder 76 is fixed on the shaft sleeve 50, so that the spring holder 76, the shaft sleeve 50 and the rotary shaft 82 rotate together. With a plurality of springs 71 provided between the spring holder 76 and the second rotary ring 74, the second rotary ring 74 on which pressures from the springs 71 are applied is able to abut the second rotary ring 74 for development of the second sealing interface 78 in between. The spring holder 76 further includes a plurality of spring slots 763 inside the annular groove 768 for accommodation of the springs 71. The springs 71 and the second rotary ring 74 are provided with a gasket 73 in between through which pressures are applied on the second rotary ring 74 uniformly by the springs 71. The second rotary ring 74 includes a plurality of cutaway portions 746 in an outer annular surface 742 thereof, and the spring holder 76 includes a plurality of raised ribs 765 designed on an inner annular surface of the annular groove 768 and coupled with the cutaway portions 746, so that the second rotary ring 74 can be driven by the spring holder 76 for rotations and the second rotary ring 74 is moveable axially. At least one perforation 767 is opened in the spring holder 76 and communicates the annular groove 768 with the outer annular wall of the spring holder 76. The perforation 767 is taken as an exit through which any chipping due to fractions among the spring holder 76, the springs 71, the gasket 73 and the second rotary ring 74 is discharged.

During assembly, the first stationary ring 42 of the first rotary sealing device 40 is installed in the end cap 28 of the seal housing 20. The first rotary ring 44 of the first rotary sealing device 40, the O-ring seal 444, the gasket 67, the springs 65 and the pump ring 60 are mounted on and positioned at the shaft sleeve 50. The shaft sleeve 50 is installed in the end cap 28, and the end cap 28 is covered on the main body 26 such that the first rotary ring 44 and the first stationary ring 42 contact each other. Then, the second stationary ring 72 of the second rotary sealing device 70 is placed on the mounting portion 261 and locked on the shoulder 268 with a retaining ring 75 for fixing the second stationary ring 72. The second rotary ring 74 of the second rotary sealing device 70, the O-ring seal 741, the gasket 73, the springs 71 and the spring holder 76 are installed on the shaft sleeve 50 in order, and the spring holder 76 is fixed on the shaft sleeve 50. After assembly, the springs 65 and 71 respectively apply normal pressures on the corresponding first and second rotary rings 44 and 74 properly to offset an axial moving clearance produced by the running pump and keep tight sealing at the first and second sealing interfaces 46 and 78 of the first and second rotary sealing devices 40 and 70. The shaft sleeve 50 of the assembled shaft-sealing device 10 is mounted around and fixed on the rotary shaft 82 directly, and the seal housing 20 is fastened on the outer surface 86 of the pump housing 80.

With the shaft-sealing device 10 installed on the rotary shaft 82 and with a pump running, the components mounted on the shaft sleeve 50 will rotate jointly with the rotary shaft 82, and each of the first and second rotary rings 44 and 74 elastically contacts one of the first and second stationary rings 42 and 72 to form the first and second sealing interface 46 and 78 for maintain the tight sealing between the pump housing 80 and the rotary shaft 82. When the pump ring 60 inside the seal space 24 rotates, a coolant is guided into the seal space 24 according to a rotation direction of the rotary shaft 82, as shown in the arrow 246 in FIG. 2. After the stream guide member 30 at the first side 242 of the opening 232 is hit by the coolant, the coolant is discharged from the seal space 24 via the coolant outlet passage 23 for circulations.

With the pump ring 60 of the shaft-sealing device 10 rotating, the coolant introduced into the seal space 24 circulates and reduces friction-induced heat at the first rotary ring 44 and the first stationary ring 42 (the coolant flowing in the center hole 22 of the seal housing 20 also cools the second rotary sealing device 70), so that a pump keep normal operation at idle without leakage. Moreover, the coolant introduced into the seal space 24 is smoothly discharged by the stream guide member 30 and successfully discharged due to the provision of the open slot 34 that refrains turbulence-induced back pressure generated by the impact of the coolant on the stream guide member 30 and the edge of the opening 232. Additionally, the guide slot 25 contributes to the higher coolant yield at the coolant outlet passage 23 and the better pumping head. Specifically, with the expansion of the guide slot 25, the coolant can directly encounter an inner wall of the coolant outlet passage 23 when flowing through the first end 254 of the guide slot 25

(FIG. 2) and can be smoothly guided into the coolant outlet passage 23, thereby further increasing the circulating effect of the coolant.

Figure 9:
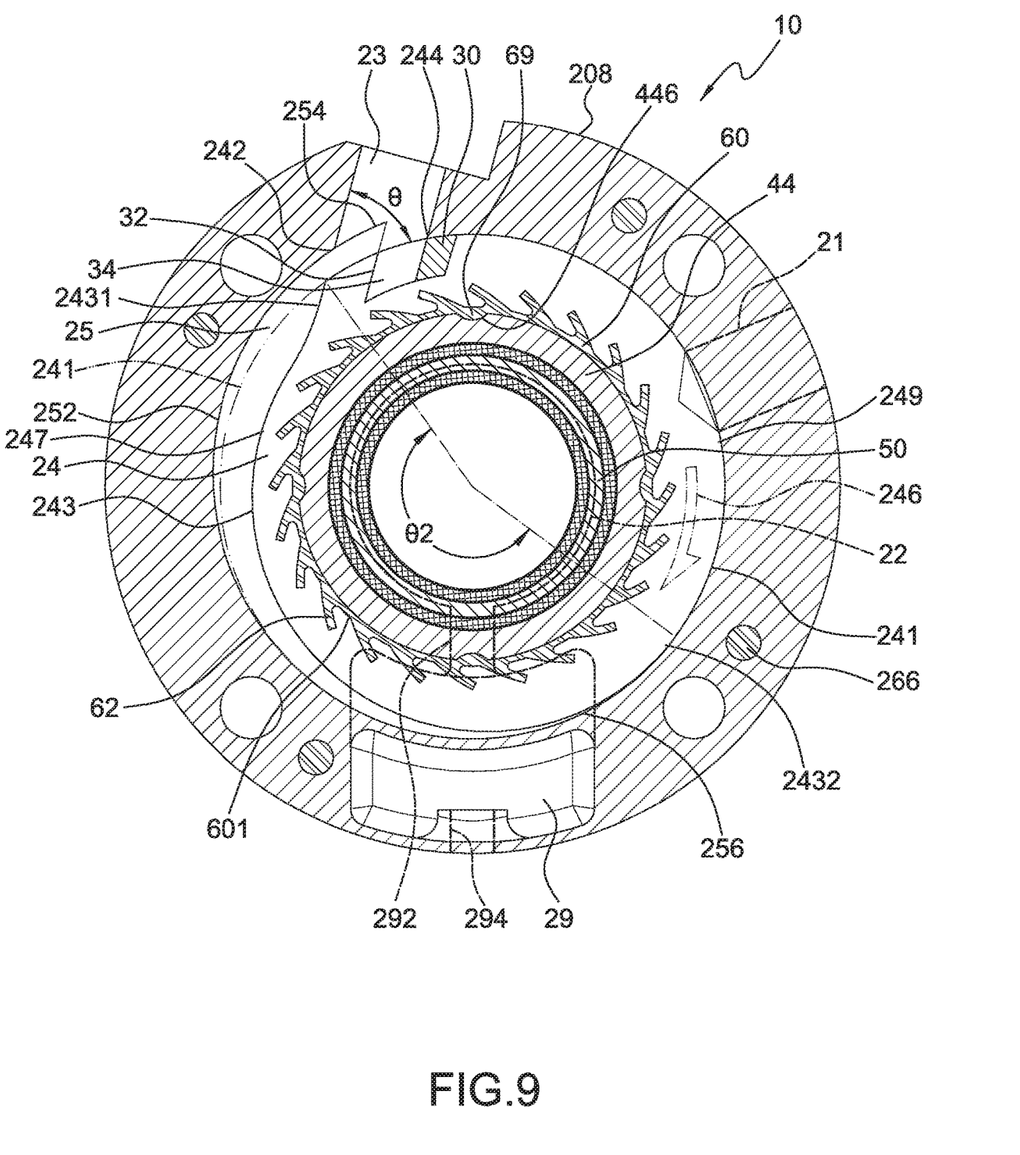
FIG. 9 is a cross sectional view similar to the cross-sectional view in FIG. 2 for an alternative embodiment of a shaft-sealing device of the present invention.

Referring to FIG. 9 for a feasible embodiment, a converging section 243 is formed at the first section 247 of the inner annular surface 241 of the seal space 24 and includes a front end 2431 adjacent to the opening 232 and a rear end 2432 away from the opening 232. In this embodiment, the front end 2431 faces the stream guide member 30, so that the coolant encounters the lateral end surface 32 of the stream guide member 30 when flowing through the converging section 243 and is guided into coolant outlet passage 23 to discharge through the opening 232. In this embodiment, the converging section 243 is within the range of a second circumferential angle θ2 of the inner annular surface 241 between the front and rear ends 2431 and 2432 and is gradually reduced in the radius of the inner annular surface 241 from the rear end 2432 to the front end 2431. The second circumferential angle θ2 is between 100 and 210 degrees preferably. With the provision of the converging section 243, the coolant agitated by the running pump ring 60 can be pressurized at the converging section 243 for the higher coolant pressure at the coolant outlet passage 23 and the better pumping head. In this embodiment, the guide slot 25 is developed in the converging section 243 of the inner annular surface 241, and the first circumferential angle θ1 is smaller than the second circumferential angle θ2.

Figure 10:
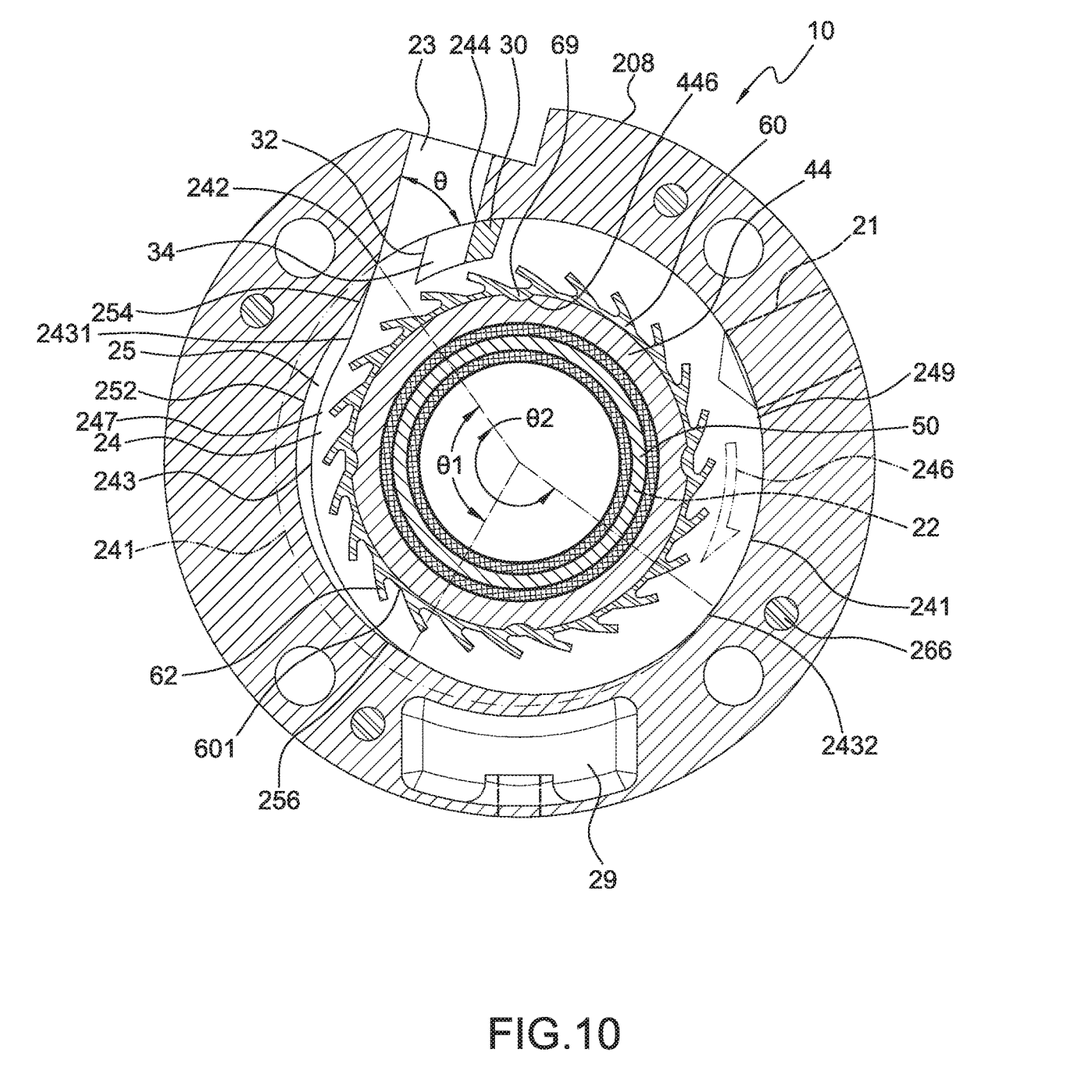
FIG. 10 is a cross sectional view similar to the cross-sectional view in FIG. 9 for a further embodiment of a shaft-sealing device of the present invention.

In virtue of the converging section 243 for the higher coolant pressure in design, the pressurized running coolant will contribute to the better pumping head, so that the guide slot 25 may not be in communication with the coolant outlet passage 23 in an alternative feasible embodiment, as shown in FIG. 10. In this embodiment of FIG. 10, the circulating coolant to be discharged from the coolant outlet passage 23 is only guided by the stream guide member 30 on which the coolant strike.

The scope of the invention is to be indicated by the appended claims, rather than by the foregoing description, and all changes which come within the meaning and range of equivalency of the claims are intended to be embraced therein.

The invention claimed is:

1. A shaft-sealing device adapted for sealing between a pump housing and a rotary shaft penetrating a shaft hole of the pump housing, with the shaft-sealing device comprising:
a seal housing adapted to be mounted to the pump housing and including a center hole extending along an axis of the rotary shaft, with the center hole including an enlarged seal space expanding in a radial direction of the center hole, with an inner annular surface defined by a wall of the center hole around the seal space, with the seal housing further including a coolant inlet passage through which a coolant is supplied into the seal space, with the seal housing further including a coolant outlet passage extending from an outer periphery of the seal housing into the seal space and intersecting the seal space at an opening, with the opening including a circumference having a first side and a second side downstream from the first side along a flowing direction of the coolant in the seal space, with the inner annular surface of the seal space including a first section adjacent to the first side of the opening and a second section adjacent to the second side of the opening, with a guide slot provided in the first section of the inner annular surface and being in communication with the coolant outlet passage;
a first rotary sealing device including a first stationary ring and a first rotary ring between which a first sealing interface is defined, with the first rotary ring mounted around the rotary shaft, with the first stationary ring abutting against the first rotary ring for development of the first sealing interface; and
a pump ring securely mounted around the rotary shaft to rotate therewith, with the pumping ring including an outer circumference having a plurality of protrusions annularly spaced from one another and extending along the axis.

2. The shaft-sealing device according to claim 1, wherein the guide slot includes a slot bottom having a first end adjacent to the opening and a second end away from the opening, with the first end developed at the coolant outlet passage, with the slot bottom gradually deepened from the second end to the first end, with the guide slot formed within a range of a first circumferential angle of the inner annular surface between the first and second ends, wherein the first circumferential angle is between 30 and 120 degrees.

3. The shaft-sealing device according to claim 1, wherein the opening is developed in the inner annular surface, with a converging section formed at the first section of the inner annular surface and including a front end adjacent to the opening and a rear end away from the opening, with the converging section being gradually reduced in a radius of the inner annular surface from the rear end to the front end, with the guide slot developed in the converging section.

4. The shaft-sealing device according to claim 1, wherein a stream guide member is provided at the second side of the opening, with a gap formed between the stream guide member and the plurality of protrusions on the pump ring in a radial direction perpendicular to the axis, with the front end of the converging section facing the stream guide member.

5. The shaft-sealing device according to claim 4, wherein the stream guide member includes a lateral end surface facing the first side and having an open slot which matches an edge of the opening in shape.

6. The shaft-sealing device according to claim 1, wherein the pump ring further includes spaced first and second ends and an annular hole extending from the first end through the second end, with the first end of the pump ring provided with a flange extending inwardly around a periphery of the annular hole, with the annular hole including an annular wall provided with a plurality of raised ribs, with the first rotary ring received in the annular hole and including an outer annular surface provided with a plurality of cutaway portions engaged with the plurality of raised ribs, with a plurality of springs installed between the first rotary ring and the flange.

7. The shaft-sealing device according to claim 6, wherein the pump ring further includes at least one perforation opened therein and communicating the annular hole with the outer circumference of the pumping ring.

8. The shaft-sealing device according to claim 1, further comprising:
a second rotary sealing device including a second stationary ring, a second rotary ring, and a spring holder, with a second sealing interface defined between the second stationary ring and the second rotary ring, with the second rotary ring and the spring holder mounted around the rotary shaft, with the spring holder including a first end surface provided with an annular groove therein, with a plurality of springs received in the annular groove and abutting against the second rotary ring received in the annular groove, with the seal housing including an internal side provided with a mounting portion formed by an annular shoulder on the seal housing, with the second stationary ring fixed on the mounting portion, with the second rotary ring including an outer annular surface provided with a plurality of cutaway portions therein, with the spring holder including a plurality of raised ribs formed in the annular groove and coupled with the cutaway portions.

9. The shaft-sealing device according to claim 8, further comprising:
a shaft sleeve extending through the center hole of the seal housing and mounted around the rotary shaft to rotate therewith, with the pump ring, the first rotary ring, the second rotary ring and the spring holder installed on an outer surface of the shaft sleeve.

10. The shaft-sealing device according to claim 8, wherein the spring holder further includes at least one perforation opened therein and communicating the annular groove with an outer annular wall of the spring holder.

11. The shaft-sealing device according to claim 1, wherein the seal housing further includes a chamber and a channel located between the seal space and an external side of the seal housing, with the channel communicating the chamber with the center hole.

12. A shaft-sealing device adapted for sealing between a pump housing and a rotary shaft penetrating a shaft hole of the pump housing, with the shaft-sealing device comprising:
a seal housing adapted to be mounted to the pump housing and including a center hole extending along an axis of the rotary shaft, with the center hole including an enlarged seal space expanding in a radial direction of the center hole, with an inner annular surface defined by a wall of the center hole around the seal space, with the seal housing further including a coolant inlet passage through which a coolant is supplied into the seal space, with the seal housing further including a coolant outlet passage extending from an outer periphery of the seal housing into the seal space and intersecting the seal space at an opening, with the opening including a circumference having a first side and a second side downstream from the first side along a flowing direction of the coolant in the seal space, with the inner annular surface of the seal space including a first section adjacent to the first side of the opening and a second section adjacent to the second side of the opening, with the opening formed in the inner annular surface, with a converging section formed at the first section of the inner annular surface and including a front end adjacent to the opening and a rear end away from the opening, with the converging section being gradually reduced in a radius of the inner annular surface from the rear end to the front end, with a stream guide member provided at the second side of the opening;
a first rotary sealing device including a first stationary ring and a first rotary ring between which a first sealing interface is defined, with the first rotary ring mounted around the rotary shaft, with the first stationary ring abutting against the first rotary ring for development of the first sealing interface; and
a pump ring securely mounted around the rotary shaft to rotate therewith, with the pumping ring including an outer circumference having a plurality of protrusions annularly spaced from one other and extending along the axis, with a gap formed between the stream guide member and the plurality of protrusions on the pump ring in a radial direction perpendicular to the axis.

13. The shaft-sealing device according to claim 12, wherein a guide slot is developed in the converging section of the inner annular surface.

14. The shaft-sealing device according to claim 12, wherein the stream guide member includes a lateral end surface facing the first side and having an open slot which matches an edge of the opening in shape.

15. The shaft-sealing device according to claim 12, wherein the pump ring further includes spaced first and second ends and an annular hole extending from the first end through the second end, with the first end of the pump ring provided with a flange extending inwardly around a periphery of the annular hole, with the annular hole including an annular wall provided with a plurality of raised ribs, with the first rotary ring received in the annular hole and including an outer annular surface provided with a plurality of cutaway portions engaged with the plurality of raised ribs, with a plurality of springs installed between the first rotary ring and the flange.

16. The shaft-sealing device according to claim 15, wherein the pump ring further includes at least one perforation opened therein and communicating the annular hole with the outer circumference of the pumping ring.

17. The shaft-sealing device according to claim 12, further comprising:
a second rotary sealing device including a second stationary ring, a second rotary ring, and a spring holder, with a second sealing interface defined between the second stationary ring and the second rotary ring, with the second rotary ring and the spring holder mounted around the rotary shaft, with the spring holder including a first end surface provided with an annular groove therein, with a plurality of springs received in the annular groove and abutting against the second rotary ring received in the annular groove, with the seal housing including an internal side provided with a mounting portion formed by an annular shoulder on the seal housing, with the second stationary ring fixed on the mounting portion, with the second rotary ring including an outer annular surface provided with a plurality of cutaway portions therein, with the spring holder including a plurality of raised ribs formed in the annular groove and coupled with the cutaway portions.

18. The shaft-sealing device according to claim 17, further comprising:
a shaft sleeve extending through the center hole of the seal housing and mounted around the rotary shaft to rotate therewith, with the pump ring, the first rotary ring, the second rotary ring and the spring holder installed on an outer surface of the shaft sleeve.

19. The shaft-sealing device according to claim 17, wherein the spring older further includes at least one perforation opened therein and communicating the annular groove with an outer annular wall of the spring holder.

20. The shaft-sealing device according to claim 12, wherein the seal housing further includes a chamber and a channel located between the seal space and an external side of the seal housing, with the channel communicating the chamber with the center hole.

* * * * *